(No Model.)

M. J. AMICK.
AUTOMATIC GAS REGULATOR.

No. 290,727. Patented Dec. 25, 1883.

Witnesses:
Geo. A. Dickson
F. M. Downey

Inventor:
Marion J. Amick
By his Atty., Edwd E. Osborn

UNITED STATES PATENT OFFICE.

MYRON J. AMICK, OF SAN FRANCISCO, CALIFORNIA, ASSIGNOR TO THE PACIFIC GAS GOVERNOR ASSOCIATION, OF SAME PLACE.

AUTOMATIC GAS-REGULATOR.

SPECIFICATION forming part of Letters Patent No. 290,727, dated December 25, 1883.

Application filed February 24, 1883. (No model.)

*To all whom it may concern:*

Be it known that I, MYRON J. AMICK, a citizen of the United States, residing in the city and county of San Francisco, State of California, have made and invented certain new and useful Improvements in Automatic Gas-Regulators; and I do hereby declare that the following is a full, clear, and exact description of my said invention, reference being had to the accompanying drawings, which form a part of this specification.

My invention relates to that class of devices or apparatus which are constructed and applied to regulate the pressure and flow of illuminating-gas through the supply-pipes of buildings; and my improvements consist in certain novel construction and arrangement of parts, more particularly described and specified hereinafter, by means of which I obtain a more certain and positive action of the valve, with consequent regularity and uniformity of operation of the entire apparatus.

The following description fully explains the nature of my said invention and the manner in which I proceed to construct, apply, use, and operate the same.

Figure 1:
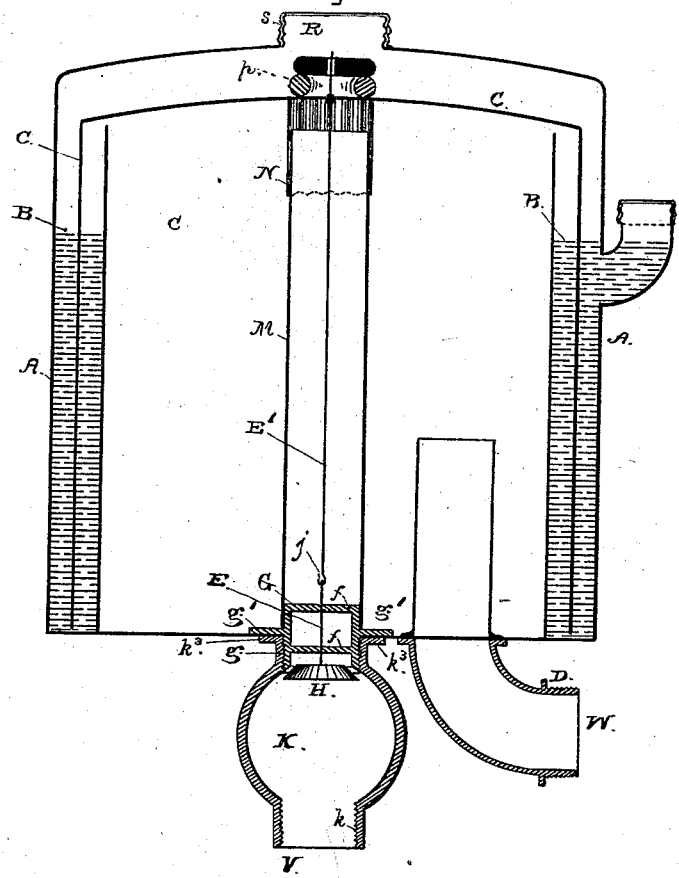
Figure 2:

In the drawings referred to, Figure 1 is a vertical section through a gas-regulator having the several features, points, or improvements of my invention applied to it. Fig. 2 is a top view of a detached portion.

In the said drawings, the parts A B C D are common to gas-regulators now in use, A B being the outer case and water-seal, C the cylinder float or head having the valve-stem attached to it, and D the connection or coupling for the supply-pipe to lead the gas from the regulator. I also employ the jointed stem or rod E, working through fixed guides $ff$ at the bottom of the case, so that the valve H on its lower end is held true to its seat and always in line; then by means of a second rod or a wire, E′, making connection of the upper end of the valve stem with the head C. At this point of attachment or connection the valve-stem E and rod E′ are joined together by a hook and eye, $j$, or by forming a knuckle-joint, or by using any other kind of flexible connection that will admit of the rod E′ following and complying with any lateral movements or vibrations of the cylinder-head C within the case, or any tendency of the head to take a position out of the vertical without affecting or disturbing the true working position and regular action of the valve H. By means of this flexible connection of valve-stem to float C the valve will respond at all times to any vertical movement of the float up or down, but will not be affected by any lateral movement of the float in the case, nor by any position of the case out of the perpendicular, whether produced by accident or by carelessness in setting up the regulator. The valve-chamber, valve-seat, guides, and coupling are formed of two parts or pieces of casting, of which the lower one, K, has the valve-chamber, a threaded coupling, $k$, to receive the supply-pipe, and a screw-threaded aperture to take the lower portion of the part G, that has an external thread, $g$, formed on the end below the flange $g'$. This part is simply a short tube or cylinder, with two cross-pieces or bridges, $ff$, cast with it, and with an inclined valve-seat, to which the conical valve H is properly ground. The top of the larger piece or casting K is provided with a flange, $k^3$, of about the same size as the flange of the part G, and between these two the edges of the sheet-metal bottom of the case A are clamped, and are held by riveting the two flanges together. Holes are drilled through the center of each bar $f$ in line with the center of the valve-seat, to form guides for the valve-stem. I protect the valve and valve-seat from the condensed matter that forms and collects upon the inside surfaces of the regulator, so that the valve is not obstructed or caused to stick to its seat. This is effected by carrying up from the top of the valve-chamber or the upper end of the casting G a tube, M, of which the top is fitted with and covered by a short section of corrugated cylinder, N, fixed to the under side of the head C. The corrugations run lengthwise, and the end of the tube slides within this cylinder with sufficient play to afford an annular passage for the gas between the two surfaces, the corrugations serving also as channels for the gas, and as conductors to lead off the condensed matter and guide it down upon the outside surface of the tube M. The connecting-rod E' is carried through the center of this protecting-tube and its cap N, and is fixed in the top of the float. Its upper end is carried out through the top and left to project a sufficient distance above to serve as a holder for weighted rings p p, that are provided for regulating the weight of the float and the amount of valve-opening. Immediately over this rod an opening, R, in the case affords a means of removing and placing these weights. This opening is closed by a cap, S.

V W are the usual inlets and outlets for the gas.

Having thus fully described my invention, what I claim, and desire to secure by Letters Patent, is—

1. In an automatic gas-regulator, the combination, with the valve, rod, and float, of the gas-chamber K and coupling G, forming the valve-seat between it and the other portions of the device, said coupling having the flange g' to fit upon the bottom of the device, a screw-threaded extension, g, for securing the chamber K, and the guides f f, substantially as set forth.

2. In a gas-regulator, the combination, with the valve and its seat, of the tubular protector M and the corrugated cap N, fixed to the float C, substantially as hereinbefore described, to operate as and for the purpose set forth.

3. The herein-described gas-regulator, consisting of the case A, having the capped inlet R, water-seal B, float C, valve H, valve-chamber G K, with guides f f, and a valve-rod, which is partly rigid and partly flexible, the protector M N, and the inlets and outlets for the gas, substantially as hereinbefore described and set forth.

MYRON J. AMICK. [L. S.]

Witnesses:
EDWARD E. OSBORN,
F. M. DOWNEY.